United States Patent [19]

Hellmann et al.

[11] Patent Number: 5,412,000
[45] Date of Patent: May 2, 1995

[54] PLASTIC PRIMER COATING OF EVA, CHLORINATED POLYOLEFIN AND EPOXY RESIN

[75] Inventors: Udo Hellmann, Remscheid; Werner Stephan, Wuppertal; Fritz Sadowski, Pulheim, all of Germany

[73] Assignee: Herberts Gesellschaft mit beschrankter Haftung, Germany

[21] Appl. No.: 216,071

[22] Filed: Mar. 17, 1994

Related U.S. Application Data

[63] Continuation of Ser. No. 102,538, Aug. 4, 1993, abandoned, which is a continuation of Ser. No. 917,795, Jul. 20, 1992, abandoned, which is a continuation of Ser. No. 667,241, Mar. 8, 1991, abandoned, which is a continuation of Ser. No. 297,304, Jan. 13, 1989, abandoned.

[30] Foreign Application Priority Data

Jan. 15, 1988 [DE] Germany .................. 38 00 938.2

[51] Int. Cl.⁶ .................. C08K 5/01; C08L 23/08; C08L 23/28; C08L 63/02
[52] U.S. Cl. .................. 523/437; 525/108; 428/413
[58] Field of Search .................. 525/108; 523/437

[56] References Cited

U.S. PATENT DOCUMENTS

4,755,553  7/1988  Kishimura et al. .............. 525/327.4

FOREIGN PATENT DOCUMENTS

45-10638  4/1970  Japan .................. 525/108
55-50042  4/1980  Japan .

*Primary Examiner*—Robert E. Sellers
*Attorney, Agent, or Firm*—Fitch, Even, Tabin & Flannery

[57] ABSTRACT

A coating and primer composition suitable as a primer for plastics such as a polyolefin which comprises: a) from about 1 to 5% by weight of ethylene/vinyl acetate copolymers, b) from about 0.5 to 5% by weight of chlorinated polyolefins, c) from about 0.01 to 5% by weight of an epoxy resin; and d) from about 85 to 98.49% by weight of an organic solvent, and optionally paint auxiliaries, pigments and/or fillers.

A method of priming plastic surfaces of an object, especially polyolefins, and particularly polypropylene, is also provided which comprises applying the aforesaid composition to a plastic surface and drying the same prior to applying paint or finish coating.

5 Claims, No Drawings

PLASTIC PRIMER COATING OF EVA, CHLORINATED POLYOLEFIN AND EPOXY RESIN

This application is a continuation, of application Ser. No. 08/102,538, filed Aug. 4, 1993, now abandoned which is a Continuation of application Ser. No. 07/917,795, filed Jul. 20, 1992, now abandoned, which is a Continuation of application Ser. No. 07/667,241, filed Mar. 8, 1991, now abandoned, which is a Continuation of application Ser. No. 07/297,304, filed Jan. 13, 1989, now abandoned.

BACKGROUND OF THE INVENTION

Field Of The Invention

This invention relates to a coating composition based on ethylene/vinyl acetate copolymers, chlorinated polyolefins, epoxy resins and organic solvents which is particularly suitable for use as a primer or coupling agent for coatings on plastics substrates. The invention also relates to methods of using the coating composition as a primer on plastics surfaces.

Description Of The Related Art

The coating of plastics surfaces, particularly polypropylene surfaces, with coating compositions is often problematical on account of the poor adhesion properties of the coating compositions. This applies in particular to the coating of plastics parts in vehicle construction and in the repair of vehicle parts, particularly based on plastics. The coating of polypropylene surfaces has proved to be particularly difficult. For example, the polypropylene has to be pretreated to obtain favorable adhesion of coating compositions, particularly fillers and paints.

SUMMARY OF THE INVENTION

The present invention relates to coating compositions which are useful as primers for plastics comprising: a) ethylene/vinyl acetate copolymers; b) chlorinated polyolefins, c) epoxy resins; and one or more organic solvents, and optionally paint auxiliaries, pigments and/or fillers of conventional known type.

The invention also comprises methods of priming surfaces of objects, especially plastic surfaces with a primer composition as described above and drying the same to provide an adherent primer coating on the surface of an object. The plastic object coated with dried primer is then coated with a finish coat of paint, lacquer or other coating which is adherent to the primed surface.

The object of the present invention is to provide a primer which is particularly suitable for the coating of plastics substrates including particularly polypropylene or other polyolefin surfaces and enables the plastics substrates to be painted with favorable adhesion without any need for complicated pretreatment.

DESCRIPTION OF THE PREFERRED EMBODIMENTS INCLUDING SPECIFIC EXAMPLE

According to the invention, this object is achieved by the provision of a coating composition which, in addition to standard paint auxiliaries, pigments and/or fillers, contains:

a) from about 1 to 5% by weight of one or more ethylene/vinyl acetate copolymers,
b) from about 0.5 to 5% by weight of one or more chlorinated polyolefins,
c) from about 0.01 to 5% by weight of one or more epoxy resins based on aromatic polyols with epichlorohydrin,
d) from about 85 to 98.49% by weight of one or more organic solvents, and optionally paint auxiliaries, pigments and/or fillers.

The coating composition according to the invention contains from about 1 to 5% by weight and preferably from about 2 to 4% by weight ethylene/vinyl acetate copolymers. The chlorinated polyolefin, which may also be a mixture of several chlorinated polyolefins, is present in a quantity of from about 0.5 to 5% by weight and preferably from about 2 to 3% by weight. The epoxy resins which the coating composition according to the invention contains are present in a quantity of from about 0.01 to 5% by weight and preferably in a quantity of from about 0.05 to 1% by weight.

Suitable ethylene/vinyl acetate copolymers are the copolymers which are typically used, for example, for hotmelt adhesives and which are soluble in typical lacquer solvents. Ethylene/vinyl acetate copolymers suitable for use in accordance with the invention preferably have a vinyl acetate content of from about 27 to 42% by weight. Examples of suitable ethylene/vinyl acetate copolymers are the commercial products ELVAX which have vinyl acetate contents of from about 27 to 42% by weight and more especially from about 30 to 40% by weight.

Suitable chlorinated polyolefins are, for example, chlorinated polyethylene, chlorinated polypropylene or mixtures thereof and, more preferably, chlorinated polypropylene of the type typically used for paint resins. A chlorine content of from about 10 to 25% by weight is preferred. Chlorinated polyolefins of the type in question are commercially available products.

The epoxy resin used in the coating composition according to the invention is a reaction product of an aromatic polyol, more especially a bisphenol, such as bisphenol A, bisphenol B and bisphenol F, with epichlorohydrin. Reaction products of bisphenol A and epichlorohydrin are particularly preferred. The preferred molecular weights are in the range from about 250 to 750 for an epoxide value of from about 0.3 to 0.7 (number of mols epoxide oxygen per 100 g resin). Examples are commercial products suitable for paint purposes, for example a reaction product of bisphenol A and epichlorohydrin having a molecular weight of from about 350 to 400 and an epoxide value of from about 0.50 to 0.55.

The coating compositions according to the invention contain from about 85 to 98.49% by weight of an organic solvent. Suitable organic solvents are any of the organic solvents typically used in paints which are suitable for dissolving the other constituents. Preferred organic solvents are aromatic solvents, such as for example xylene and, more preferably, toluene, optionally in admixture with one another and with other solvents.

In addition to the above-mentioned quantities of individual components, the coating compositions according to the invention may contain other constituents, including for example typical paint auxiliaries, pigments and/or fillers.

The coating compositions according to the invention are ready-to-use, for example sprayable, compositions. They are preferably applied by spraying. The compositions according to the invention may be sprayed, for example, as primers onto plastics surfaces. Any plastics surfaces are suitable, plastics of the type used in motor vehicles being particularly suitable. It has surprisingly been found that the coating composition according to the invention may be used in particular as a primer for polypropylene surfaces, so that there is no need for any of the special pretreatments hitherto necessary for the painting of polypropylene substrates.

Accordingly, the coating compositions according to the invention are particularly suitable for use as primers for surfaces that are difficult to paint, particularly plastics surfaces and, preferably, polypropylene surfaces, of the type used in the construction and repair of motor vehicles. Accordingly, the coating compositions according to the invention are particularly suitable for the painting and repair of motor vehicles and motor vehicle parts having plastics surfaces.

The paint coatings are applied by the two-coat or three-coat process. Depending on the level of stressing envisaged, they are applied by the two-coat system (particularly for internal stressing) or by the three-coat system (particularly for external stressing). As a primer, the coating composition according to the invention is applied, for example, by spraying to the substrate to be painted. Subsequent drying in air, for example for about 20 minutes, is sufficient, although oven drying is also possible. Typical fillers and/or finishing paints, for example typical car repair paints, preferably elasticized two-component polyurethane products, may then be applied to the coating obtained.

EXAMPLE

A coating and primer composition was prepared by dissolving 2.6 parts by weight of an ethylene/vinyl acetate copolymer containing 33.0% by weight vinyl acetate, 6.6 parts by weight chlorinated polyolefin (40% in xylene) containing 18 to 23.5% by weight chlorine and 0.1 part by weight of an epoxy resin based on bisphenol A and epichlorohydrin having a molecular weight of approximately 370 in 18 parts by weight toluene. The composition was then diluted to a sprayable viscosity with 72.7% by weight toluene.

The coating composition thus obtained was sprayed onto a degreased, cleaned polypropylene surface in a layer thickness of 4 cm. The coating thus applied was dried in air for 20 minutes and overpainted with a polyurethane filler and then with a polyurethane paint. An excellently adhering coating of optically satisfactory appearance was obtained.

What is claimed is:

1. A sprayable plastic primer coating composition for priming a polyolefin plastic surface of a structural vehicle part consisting essentially of:
   a) from about 1 to 5% by weight of one or more ethylene/vinyl acetate copolymers which have a vinyl acetate content of from about 27 to 42 weight percent,
   b) from about 0.5 to 5% by weight of one or more chlorinated polyolefins having a chlorine content of from about 10 to 25 weight percent,
   c) from about 0.01 to 5% by weight of one or more epoxy resins prepared by reaction of aromatic polyols with epichlorohydrin,
   d) from about 85 to 98.49% by weight of one or more organic solvents containing at least one solvent selected from the group consisting of xylene, toluene and mixtures thereof.

2. A coating composition according to claim 1 wherein component b) is a chlorinated polypropylene.

3. A coating composition according to claim 1 wherein component c) is a reaction product of bisphenol A with epichlorohydrin.

4. A coating composition according to claim 1 wherein component c) has a number average molecular weight of from about 250 to 750 and an epoxide value of from about 0.3 to 0.7.

5. A primer coating composition according to claim 1 which also includes as a part of component (d) of the primer composition an additive selected from the group consisting of pigments, fillers paint auxiliaries other than the organic solvents, pigments and fillers, and mixtures thereof.

* * * * *